C. W. DAKE.
BALANCED VALVE FOR TURBINES.
APPLICATION FILED AUG. 4, 1913.
1,145,566. Patented July 6, 1915.
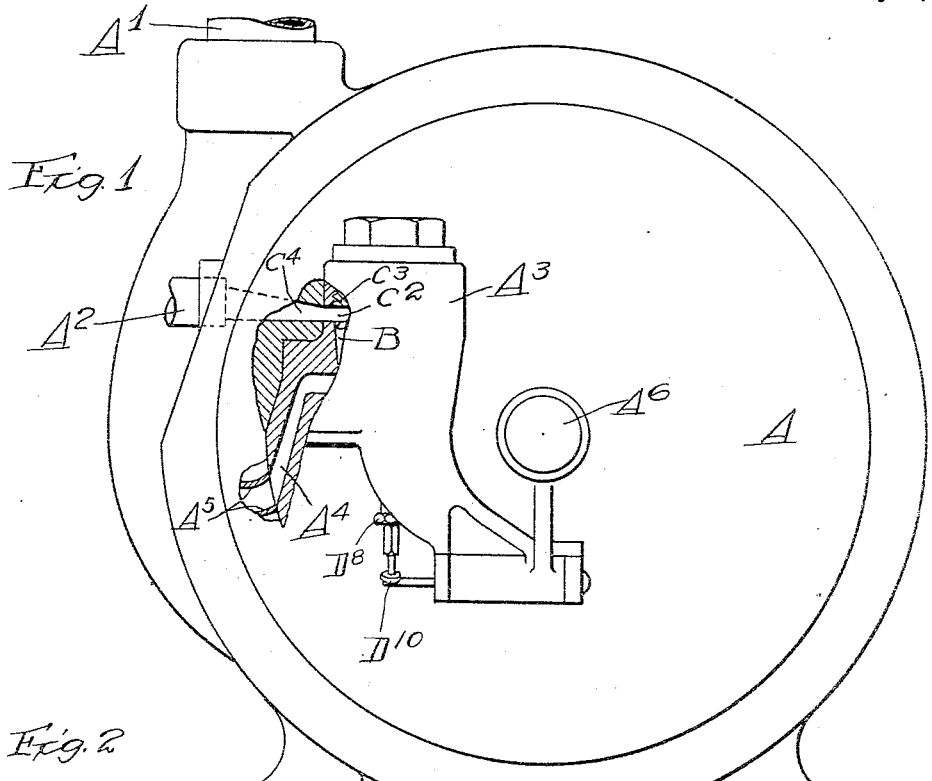
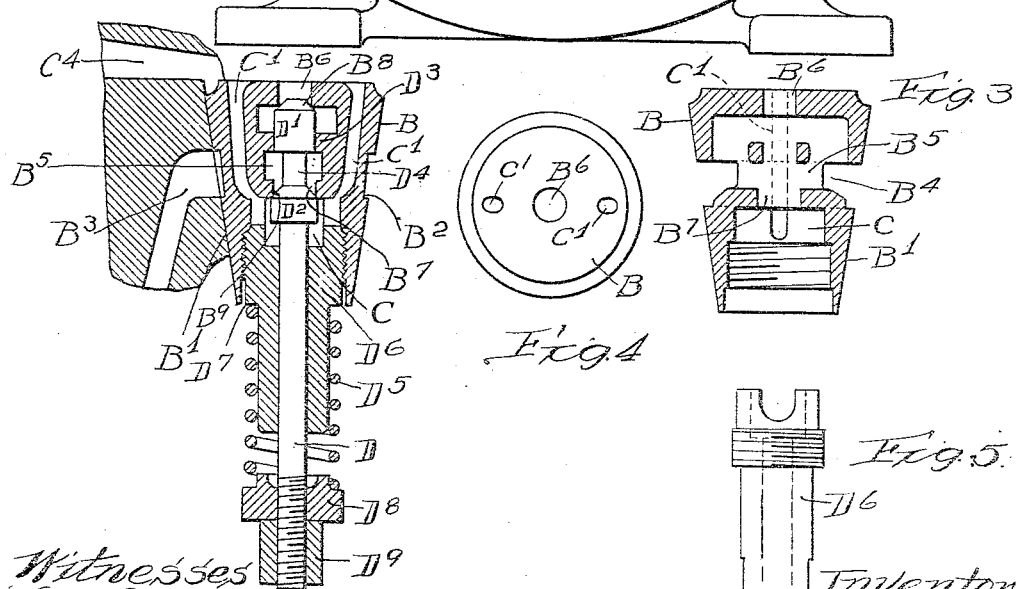
Witnesses
Inventor
Charles W. Dake
by Parker & Carter
his Att'ys

UNITED STATES PATENT OFFICE.

CHARLES W. DAKE, OF CHICAGO, ILLINOIS, ASSIGNOR TO PYLE-NATIONAL ELECTRIC HEADLIGHT COMPANY, OF CHICAGO, ILLINOIS, A CORPORATION OF NEW JERSEY.

BALANCED VALVE FOR TURBINES.

1,145,566.

Specification of Letters Patent.

Patented July 6, 1915.

Application filed August 4, 1913. Serial No. 732,877.

*To all whom it may concern:*

Be it known that I, CHARLES W. DAKE, a citizen of the United States, residing at Chicago, in the county of Cook and State of Illinois, have invented a certain new and useful Improvement in Balanced Valves for Turbine-Engines, of which the following is a specification.

My invention relates to improvements in balanced valves for turbine engines and the like or for any other situation wherein steam or fluid under pressure must be controlled by a sensitive controlling mechanism.

It is illustrated diagrammatically in one form in the accompanying drawings, wherein—

Figure 1 is an end elevation of a turbine with parts in section and parts broken away; Fig. 2 is a detail section through the valve; Fig. 3 is a detail section of the valve cage at right angles to the section of Fig. 2; Fig. 4 is a plan view of the valve cage; and Fig. 5 is a detailed elevation of the valve guide plug.

Like parts are indicated by like letters throughout the several figures.

A is a turbine housing.

$A^1$ is an exhaust pipe leading from the turbine housing.

$A^2$ is a steam pipe leading to the turbine.

$A^3$ is a valve housing mounted on the turbine housing.

$A^4$ is an expanding steam nozzle leading from the valve housing $A^3$ and discharging into the buckets $A^5$ of a bucket wheel.

$A^6$ is the turbine shaft which will in actual practice carry a governor of some kind or other not here shown, since any form of governor might be made to do.

B is a valve cage located in the valve housing $A^3$ and held therein by any suitable means not here specifically illustrated. This valve cage is conical as indicated to engage the conical seat in the valve housing $A^3$ as at $B^1$. An annular ring or channel $B^2$ about the cage B communicates with the nozzle $A^4$ by means of the passage $B^3$. This annular ring communicates by means of the ports $B^4$ with the chamber $B^5$ in the interior of the valve cage. Communicating with the chamber $B^5$ at top and bottom are the passages $B^6$, $B^7$. A valve seat $B^8$ is located intermediate the chamber $B^5$ and passage $B^6$. The valve seat $B^9$ is located at the lower end of the passage $B^7$. A steam chamber C is located in the base of the cage B beneath the valve seat $B^9$ and communicates by means of the passages $C^1$ with a chamber $C^2$ in the valve housing $A^3$ formed by the pipe and the plug $C^3$ and bounded at the bottom by the top of the cage B and communicating by means of the passage $C^4$ with the steam pipe $A^2$.

A valve stem D is slidable in the cage B and has thereon the valves $D^1$, $D^2$ in opposition respectively to the valve seats $B^8$, $B^9$, the valve $D^1$ being caught by the bracket $D^3$ in the chamber $B^5$. It is important to note that the area of the passage $B^6$ is equal to the area of the passage $B^7$ less the cross-sectional area of the valve stem $D^4$ between the valves $D^1$ and $D^2$. It will be noted then that the steam pressure is applied to the top of the valve $D^2$ and on the bottom of the valve $D^1$ and that, since their effective areas are equal, the valve is thus balanced. The plug $D^5$ is screw-threaded in the cage B and forms a guide for the valve stem D, being surrounded by a spiral spring $D^6$ which rests against the shoulder $D^7$ at one end and a nut $D^8$ screw-threaded to the valve stem D at the other end. A lock nut $D^9$ is provided to hold the nut $D^8$ in position. Screw-threaded on the end of the valve stem D is a tappet $D^{10}$ provided for contact with any suitable form of governor not here shown.

It will be evident that, while I have shown in my drawings an operative device, still many changes might be made in size, shape and arrangement of parts without departing materially from the spirit of my invention. I wish, therefore, that my drawings be regarded as in a sense diagrammatic.

The use and operation of my invention is as follows: When steam is admitted to the steam chamber in the top of the valve housing, it will, as above indicated, exert a pressure on the valve members above and below the central steam chamber, and, since these valve members or passages controlled by them are of the same effective areas, the steam pressure will balance and the yielding spring will be free to hold the valves open. The steam will thus pass through both passages from the supply into the central steam passage and thence through the annular channel to the nozzle, and this condition persists no matter what the position of the valve, since for any position of the valve the steam pressures are balanced and therefore the sensitive governor, which for the purpose of clearness I have not here shown in the drawings, will be free to operate the valve to regulate the supply of steam.

I claim:

1. A valve for steam turbines and the like comprising a housing, a tapered socket therein, a valve cage removably mounted in said socket, a plurality of valve seats in said cage, a plurality of balanced valves and means for operating them to and from said seats, a fluid supply leading to one side of said valve seats and a fluid discharge leading from the other side thereof.

2. A valve for steam turbines and the like comprising a housing, a socket therein, a valve cage removably mounted in said socket, a plurality of valve seats in said cage, a plurality of balanced valves and means for operating them to and from said seats, a fluid supply leading to one side of said valve seats and a fluid discharge leading from the other side thereof.

3. A valve for steam turbines and the like comprising a housing, a socket therein, a valve cage removably mounted in said socket, a balanced valve in said cage, means for operating said valve, a fluid supply leading to one side of said valve, and a fluid discharge leading from the other side.

4. A valve for steam turbines and the like comprising a housing, a socket therein, a valve cage removably mounted in said socket, a plurality of valve seats in said cage, a plurality of valves one for each seat, and means for operating them to and from said seats, a steam discharge chamber interposed between the valves, steam supply chambers on opposite sides of the valves, the effect or areas of said valves being substantially equal.

In testimony whereof, I affix my signature in the presence of two witnesses this 26th day of July, 1913.

CHARLES W. DAKE.

Witnesses:
LAUREL M. DOREMUS,
MINNIE M. LINDENAN.